United States Patent
Lee et al.

(10) Patent No.: US 10,032,288 B2
(45) Date of Patent: Jul. 24, 2018

(54) METHOD AND SYSTEM FOR GENERATING INTEGRAL IMAGE MARKER

(71) Applicant: Electronics and Telecommunications Research Institute, Daejeon (KR)

(72) Inventors: Dong Chun Lee, Daejeon (KR); Jun Seong Bang, Daejeon (KR); Hun Joo Lee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 15/437,239

(22) Filed: Feb. 20, 2017

(65) Prior Publication Data

US 2018/0101964 A1    Apr. 12, 2018

(30) Foreign Application Priority Data

Oct. 11, 2016   (KR) .................. 10-2016-0131309

(51) Int. Cl.
*G06K 9/00*   (2006.01)
*G06T 7/70*   (2017.01)

(52) U.S. Cl.
CPC ...... *G06T 7/70* (2017.01); *G06T 2207/30204* (2013.01); *G06T 2207/30244* (2013.01)

(58) Field of Classification Search
CPC .......... G06T 7/70; G06T 7/60; G06T 7/0018; G06T 7/0042; G06T 2207/30244;
(Continued)

(56) References Cited

U.S. PATENT DOCUMENTS

| 9,877,009 B2* | 1/2018 | Tran ................... H04N 13/0239 |
| 2011/0248995 A1* | 10/2011 | Vaughan .................. G06K 9/44 345/420 |

(Continued)

FOREIGN PATENT DOCUMENTS

| KR | 10-1039298 | 6/2011 |
| KR | 10-1277737 | 6/2013 |

(Continued)

OTHER PUBLICATIONS

Jong-Hyun Yoon et al., "Increasing Camera Pose Estimation Accuracy Using Multiple Markers", ICAT 2006, LNCS 4282, pp. 239-248, 2006.

(Continued)

*Primary Examiner* — Amir Alavi
(74) *Attorney, Agent, or Firm* — Kile Park Reed & Houtteman PLLC

(57) ABSTRACT

Provided is a method and system for integrating multiple image markers to generate a single integral image marker for configuring content such as game content. The present invention proposes a method of expressing, in a global coordinate system, feature points for each image marker whose positions are expressed in their local coordinate system by calculating relative positions of the image markers and applying the calculated relative positions to the image makers other than a reference image maker to transform 3D positions of feature points in each image marker.

20 Claims, 7 Drawing Sheets

(58) Field of Classification Search
CPC ..... G06T 19/20; G06T 19/006; G06T 15/006; G06T 11/60; G06F 3/013; H04N 13/0246; H04N 13/0296; H04N 13/0429; H04N 13/0235

See application file for complete search history.

(56) References Cited

U.S. PATENT DOCUMENTS

| | | | |
|---|---|---|---|
| 2012/0121137 A1* | 5/2012 | Aoki | G06K 9/3216 382/106 |
| 2012/0154439 A1 | 6/2012 | Ahn et al. | |
| 2013/0148851 A1* | 6/2013 | Leung | G06K 9/3241 382/103 |
| 2013/0222427 A1 | 8/2013 | Heo et al. | |
| 2015/0002540 A1 | 1/2015 | De et al. | |
| 2015/0168136 A1* | 6/2015 | Kamat | B60R 11/04 348/136 |
| 2016/0005174 A1* | 1/2016 | Ellsworth | G06T 7/73 382/103 |
| 2016/0307374 A1* | 10/2016 | Kurz | G06T 19/006 |
| 2016/0327383 A1* | 11/2016 | Becker | G01B 11/005 |
| 2018/0046874 A1* | 2/2018 | Guo | G06K 9/3208 |

FOREIGN PATENT DOCUMENTS

KR  10-2014-0128647  11/2014
KR  10-1529820  6/2015

OTHER PUBLICATIONS

Georg Klein et al., "Parallel Tracking and Mapping on a Camera Phone" Active Vision Laboratory Department of Engineering Science, University of Oxford.

* cited by examiner

FIG. 1B

| NO. | 2D POSITION | 3D POSITION |
|---|---|---|
| 1 | 100, 127 | 10.0, 0, 12.7 |
| 2 | 125, 150 | 12.5, 0, 15 |
| 3 | 234, 330 | 23.4, 0, 33 |
| 4 | 270, 386 | 27, 0, 38.6 |
| 5 | 450, 332 | 45, 0, 33.2 |
| 6 | 328, 553 | 32, 0, 55.3 |
| ... | | |

130 — 2D POSITION
140 — 3D POSITION

FIG. 2B

| NO. | 2D POSITION | 3D POSITION |
|---|---|---|
| 1 | 100, 127 | 10.0, 0, 12.7 |
| 2 | 125, 150 | 12.5, 0, 15 |
| 3 | 234, 330 | 23.4, 0, 33 |
| 4 | 270, 386 | 27, 0, 38.6 |
| 5 | 450, 332 | 45, 0, 33.2 |
| ... | | |

FIRST IMAGE MARKER 200

| NO. | 2D POSITION | 3D POSITION |
|---|---|---|
| 1 | 120, 227 | 12.0, 0, 22.7 |
| 2 | 325, 146 | 32.5, 0, 14.6 |
| 3 | 274, 137 | 27.4, 0, 13.7 |
| 4 | 220, 285 | 22, 0, 28.5 |
| 5 | 357, 392 | 35.7, 0, 39.2 |
| ... | | |

SECOND IMAGE MARKER 210

| NO. | 2D POSITION | 3D POSITION |
|---|---|---|
| 1 | 205, 327 | 20.5, 0, 32.7 |
| 2 | 215, 253 | 21.5, 0, 25.3 |
| 3 | 234, 330 | 23.4, 0, 33 |
| 4 | 174, 286 | 17.4, 0, 28.6 |
| 5 | 450, 332 | 45, 0, 33.2 |
| ... | | |

THIRD IMAGE MARKER 220

[2D POSITION AND 3D POSITION OF FEATURE POINTS FOR EACH IMAGE MARKER IN LOCAL COORDINATE SYSTEM]

FIG. 2C

| NO. | 2D POSITION | 3D POSITION |
|---|---|---|
| 1 | 100, 127 | 10.0, 0, 12.7 |
| 2 | 125, 150 | 12.5, 0, 15 |
| 3 | 234, 330 | 23.4, 0, 33 |
| 4 | 270, 386 | 27, 0, 38.6 |
| 5 | 450, 332 | 45, 0, 33.2 |
| ... | | |

FIRST IMAGE MARKER 200

| NO. | 2D POSITION | 3D POSITION |
|---|---|---|
| 1 | 120, 227 | 82.0, 0, 22.7 |
| 2 | 325, 146 | 102.5, 0, 14.6 |
| 3 | 274, 137 | 97.4, 0, 13.7 |
| 4 | 220, 285 | 92, 0, 28.5 |
| 5 | 357, 392 | 105.7, 0, 39.2 |
| ... | | |

SECOND IMAGE MARKER 210

| NO. | 2D POSITION | 3D POSITION |
|---|---|---|
| 1 | 205, 327 | 70.5, 0, 87.7 |
| 2 | 215, 253 | 71.5, 0, 80.3 |
| 3 | 234, 330 | 73.4, 0, 88 |
| 4 | 174, 286 | 67.4, 0, 83.6 |
| 5 | 450, 332 | 95, 0, 88.2 |
| ... | | |

THIRD IMAGE MARKER 220

[2D POSITION OF FEATURE POINTS FOR EACH IMAGE MARKER IN LOCAL COORDINATE SYSTEM AND 3D POSITION OF FEATURE POINTS FOR EACH IMAGE MARKER IN GLOBAL COORDINATE SYSTEM]

METHOD AND SYSTEM FOR GENERATING INTEGRAL IMAGE MARKER

CROSS-REFERENCE TO RELATED APPLICATION

This application claims priority to and the benefit of Korean Patent Application No. 10-2016-0131309, filed on Oct. 11, 2016, the disclosure of which is incorporated herein by reference in its entirety.

BACKGROUND

1. Field of the Invention

The present invention relates to generation of an integral image marker, and more particularly, to a method and system for integrating multiple image markers to generate a single integral image marker for configuring content such as game content.

2. Discussion of Related Art

Augmented reality technology using a natural image marker is being widely used in the field of augmented reality because camera pose data error is small. Also, plenty of augmented reality content using two or more natural image markers is being developed.

Augmented reality technology using such a natural image marker extracts hundreds of two-dimensional (2D) feature points from an image marker, maps three-dimensional (3D) position values to the extracted 2D feature points, compares the 2D feature points extracted from the image marker with feature points extracted from a camera input image, and calculates a pose data for the camera.

Conventional augmented reality technologies using a natural image marker have limitations in that the 3D position values mapped to the 2D feature points extracted from the image marker are independent of where an image maker is placed, and thus it is difficult to configure game content that utilizes one coordinate system in an augmented reality space in which multiple markers are disposed.

Also, the conventional augmented reality technology using multiple natural image markers have a difficulty in calculating a pose of a camera when only a portion of a image marker is captured by the camera.

SUMMARY OF THE INVENTION

The present invention is directed to providing a method and system for integrating multiple image markers to generate a single integral image marker for configuring content such as game content.

According to an aspect of the present invention, there is provided a system for generating an integral image marker. The system includes a data initialization unit configured to generate information regarding individual input image markers and initialize data; a storage unit configured to store the information generated by the data initialization unit and the data initialized by the data initialization unit; a camera configured to capture an image of a predetermined area and provide the captured image; and a controller configured to detect image markers included in the image, calculate a camera pose of each of the detected image markers when the number of detected image markers is greater than or equal to two, calculate relative camera pose between the detected image markers and error value of the relative camera pose between the detected image markers, update prestored relative camera pose between the detected image markers and error value of relative camera pose between the detected image markers and the calculated error value of the relative camera pose between the detected image markers, and generate an integral image marker by applying the prestored relative camera pose between the image markers to 3D coordinates of feature points in a target image marker, when an end signal is input.

According to another aspect of the present invention, there is provided a method of generating an integral image marker. The method includes generating information regarding individual input image markers and initialize data; capturing an image of a predetermined area with a camera, detecting image markers included in the captured image, and calculating a camera pose of each of the detected image markers; calculating relative camera pose between the detected image markers and error value of the relative camera pose between the detected image markers, when the number of detected image markers is greater than or equal to two; updating prestored relative camera pose between detected image markers and error value of camera pose between detected image markers to the calculated relative camera pose between the detected image markers and the calculated error value of the relative camera poses of the detected image markers; and determining whether an end signal is input and generating an integral image marker by applying the prestored relative camera pose between the image markers to 3D coordinates of feature points in a target image marker, when an end signal is input.

BRIEF DESCRIPTION OF THE DRAWINGS

The above and other objects, features and advantages of the present invention will become more apparent to those of ordinary skill in the art by describing, in detail, exemplary embodiments thereof with reference to the accompanying drawings in which:

FIG. 1B is a diagram showing a 2D position and a 3D position of each feature point of FIG. 1A;

FIG. 2B is a diagram showing examples of 2D positions and 3D positions of feature points for each image marker in a local coordinate system;

FIG. 2C is a diagram showing examples of 2D positions of feature points for each image marker in a local coordinate system and a 3D position of feature points for each image marker in a global coordinate system;

DETAILED DESCRIPTION OF EXEMPLARY EMBODIMENTS

Figure 1A:
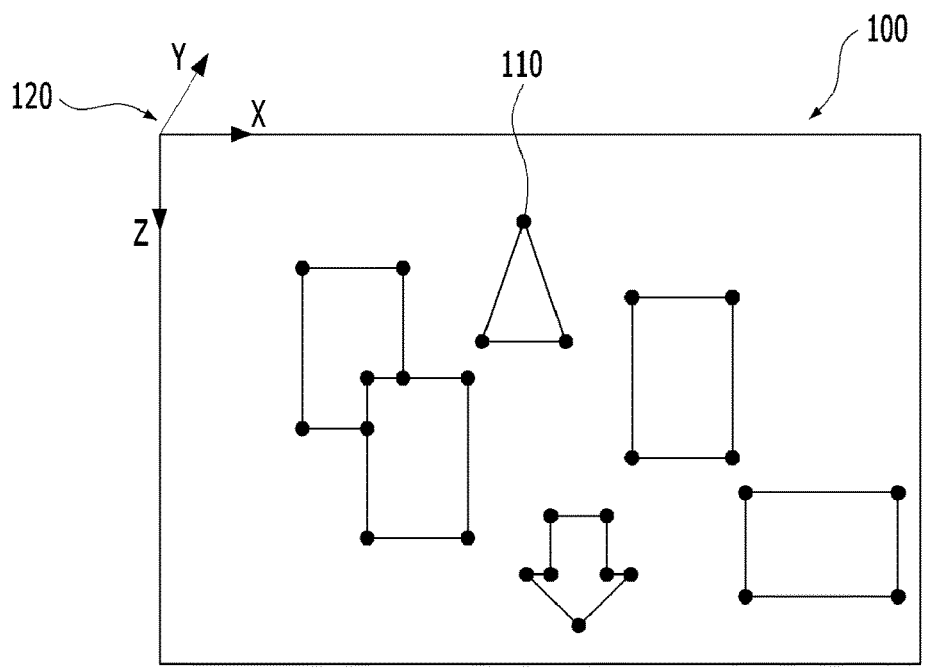
FIG. 1A is a diagram showing multiple feature points included in one image marker that is used to generate an integral image marker.

Various example embodiments will now be described more fully with reference to the accompanying drawings in which some example embodiments are shown. Specific structural and functional details disclosed herein are merely represented for purposes of describing example embodiments. The present invention, however, may be embodied in many alternate forms and should not be construed as limited to only the example embodiments set forth herein.

Accordingly, while example embodiments of the invention are subject to various modifications and alternative forms, embodiments thereof are shown by way of examples in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the" are intended to include the plural forms as well, unless the context clearly indicates otherwise. It will be further understood that the terms "comprises," "comprising," "includes," "including," and/or "having," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in a specific block may occur out of the order noted in the flowchart. For example, two blocks shown in succession may in fact be executed substantially concurrently or may sometimes be executed in the reverse order, depending upon functionality/acts involved.

A system and method for integrating multiple image markers to generate a single integral image marker that is proposed by the present invention will be described below with reference to the accompanying drawings.

Before a configuration of the integral image marker generating system of the present invention is described, a method of defining 2D positions and 3D positions of feature points of image markers used in the present invention will be described in detail.

FIG. 1A is a diagram showing multiple feature points included in one image marker used to generate an integral image marker, and FIG. 1B is a diagram showing a 2D position and a 3D position of each feature point of FIG. 1A.

Referring to FIG. 1A and FIG. 1B, multiple feature points 110 are included in one image marker 100, and a 2D position 130, which has uv coordinates for each feature point 110 in an image, and a 3D position 140, which has coordinates in a 3D space, are defined.

In this case, the 3D position 140, which has coordinates in a 3D space, is calculated from the 2D position 130, 3D local coordinate axes 120, and a scale value. The method of calculating a 3D position for each feature point is technology publicly known in the technical field of the invention, and thus a detailed description thereof will be omitted.

FIG. 1A and FIG. 1B show an example in which the upper left corner of the image marker 100 is defined as the origin (0, 0, 0) of the 3D local coordinate axes, a transverse direction of the image marker 100 is set as the X axis of 3D coordinates, a longitudinal direction of the image marker 100 is set as the Z axis of 3D coordinates, a direction toward the image marker 100 is set as the Y axis of 3D coordinates, a scale value is set as 0.1, and a change in the 2D uv coordinates in the image marker 100 equal to 1 indicates a change of 0.1 in the 3D coordinates.

It should be appreciated that the coordinate axes can be variously set. For example, the transverse direction of the image marker 100 may be set as the X-axis of the 3D coordinates, the longitudinal direction of the image marker 100 may be set as the Y-axis, and a direction away from the image marker 100 may be set as the Z-axis.

Also, the origin of the 3D local coordinate axes may be set as the lower left corner of the image marker 100.

According to an embodiment of the present invention, the 3D local coordinate axes 120 used for the image marker 100 is a local coordinate system for each image marker. The same original position and direction of the coordinate axes and also the scale value are defined for all image markers.

Accordingly, feature points 110 having the same 2D position 130 in multiple image markers 100 also have the same 3D position 140.

The present invention proposes a method of expressing, in a global coordinate system, feature points for each image marker whose positions are expressed in their local coordinate system by calculating relative positions of the image markers and applying the calculated relative positions to the image makers other than a reference image maker to transform 3D positions of feature points in each image marker.

Figure 2A:
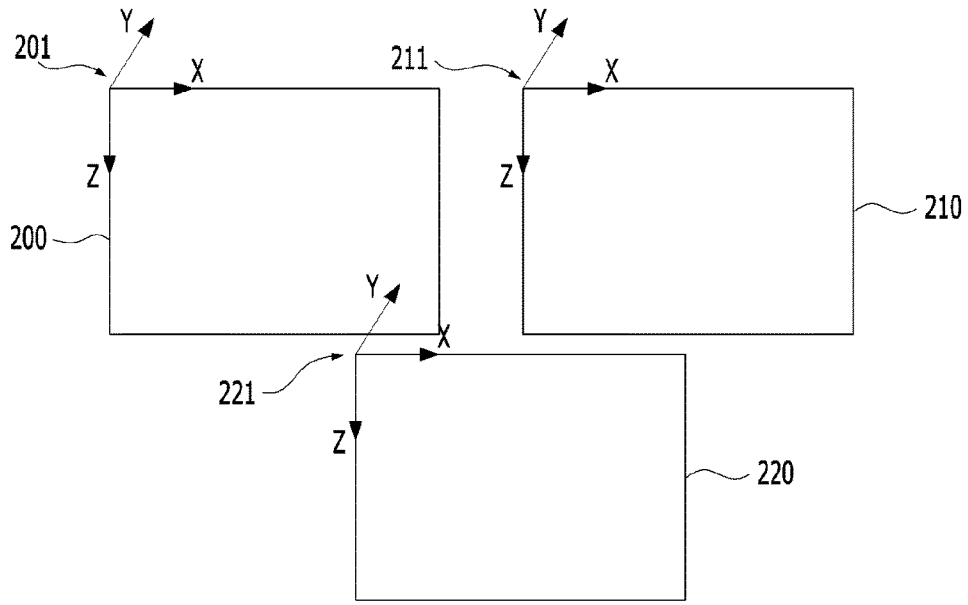
FIG. 2A is a diagram showing a state in which a single integral image marker is generated by integrating multiple image markers disposed in a space.

FIG. 2A is a diagram showing a state in which a single integral image marker is generated by integrating multiple image markers disposed in a space, FIG. 2B is a diagram showing examples of 2D positions and 3D positions of feature points for each image marker in a local coordinate system, and FIG. 2C is a diagram showing examples of 2D positions of feature points for each image marker in a local coordinate system and 3D positions of feature points for each image marker in a global coordinate system.

An embodiment shown in FIG. 2A assumes that three image markers 200, 210, and 220 are disposed in a space, origins 201, 211, and 221 of 3D local coordinate axes of the three image markers are upper left corners of the image markers 200, 210, and 220 and shows an example in which the second image marker 210 is spaced from the first image marker 200 by 70 in the X-axis direction, the third image marker 220 is spaced from the first image marker 200 by 60 in the X-axis direction and by 55 in the Z-axis, and the three image markers 200, 210, and 220 are disposed in the same plane.

The 3D positions of the feature points for each image marker shown in FIG. 2B are examples of coordinates determined with respect to the origins of the 3D local coordinates of the image markers 200, 210, and 220, and the coordinates are variable depending on the settings.

Also, the 3D positions of the feature points for each image marker shown in FIG. 2C are examples of coordinates determined by transforming the 3D positions of the feature points of the second image marker 210 and the 3D positions of the feature points of the third image marker 220 using the origin 201 of the 3D local coordinate axes of the first image marker 200 as the origin of 3D global coordinate axes.

Comparing FIG. 2B and FIG. 2C, it can be seen that X coordinates of the 3D positions of the feature points of the second image marker 210 increase by 70, X coordinates of the 3D positions of the feature points of the third image marker 220 increase by 50, and Z coordinates of the 3D positions of the feature points of the third image marker 220 increase by 55.

As a result, the transformation of the 3D positions of the feature points of the second image marker 210 and the 3D positions of the feature points of the third image marker 220 using the origin 201 of the 3D local coordinate axes of the first image marker 200 as the origin of 3D global coordinate axes refers to increasing corresponding coordinates of the 3D positions of the feature points of the second image marker 210 by a relative difference in distance of the second image marker 210 from the first image marker 200 and increasing corresponding coordinates of the 3D positions of the feature points of the third image marker 220 by a relative difference in distance of the third image marker 220 from the first image marker 200.

Figure 2A:
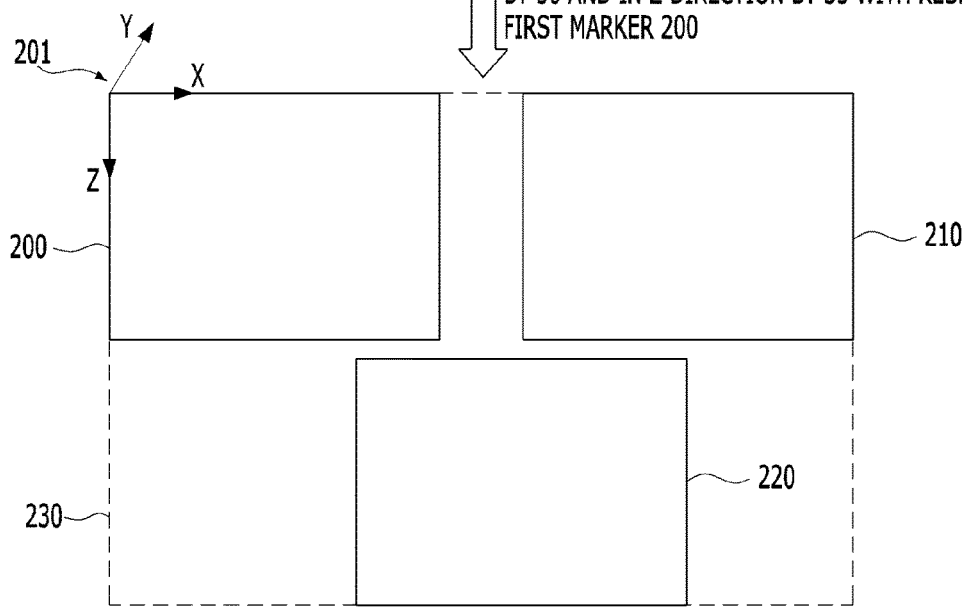

That is, in an embodiment of FIG. 2, the second image marker 210 is relatively spaced from the first image marker 200 by 70 in the X-axis direction, and third image marker 220 is spaced from the first image marker 200 by 50 in the X-axis direction and by 55 in the Z-axis direction.

Accordingly, when the 3D positions of the feature points of the second image marker 210 and the 3D positions of the feature points of the third image marker 220 are transformed using the origin 201 of the 3D local coordinate axes of the first image marker 200 as the origin of 3D global coordinate axes, X coordinates of the 3D positions of the feature points of the second image marker 210 increase by 70, and X coordinates of the 3D positions of the feature points of the third image marker 220 increase by 50 and Z coordinates of the 3D positions of the feature points of the third image marker 220 increase by 55.

An embodiment of FIG. 2 assumes that the image markers are in the same plane without considering the image marker's rotation. However, the method proposed by the present invention is applicable to a case in which the image markers are not in the same plane and also applicable to a case in which the image marker is rotated.

As described above, the feature points of the second image marker 210 and the feature points of the third image marker 220 are expressed in a single global coordinate system having the 3D local coordinate axes 201 of the first image marker 200 as a reference (here, the first image marker is a reference image marker), Accordingly, a global coordinate system having the 3D local coordinate axes 201 of the first image marker 200 as global coordinate axes is formed, and the single integral image marker 230 including the first image marker 200, the second image marker 210, and the third image marker 220 is generated.

That is, there are three coordinate systems having the originals 201, 211, and 221 of 3D local coordinate axes for each image marker as references. When the single integral image marker 230 is generated according to an embodiment of the present invention, the 3D positions of all the feature points may be expressed using one global coordinate system having the 3D local coordinate axes 201 (here, the 3D local coordinate axes of the first image marker are global coordinate axes) of the first image marker as a reference.

Instead of a method of expressing 3D positions of feature points of multiple image markers with respect to origins of 3D local coordinate axes of the image markers, a method of expressing 3D positions of feature points of multiple image markers with respect to the origin of 3D local coordinate axes of a reference image marker among the image markers has been described above.

A process of integrating multiple image markers to generate a single integral image marker that is proposed by the present invention will be described below with reference to the accompanying drawings.

Figure 3:
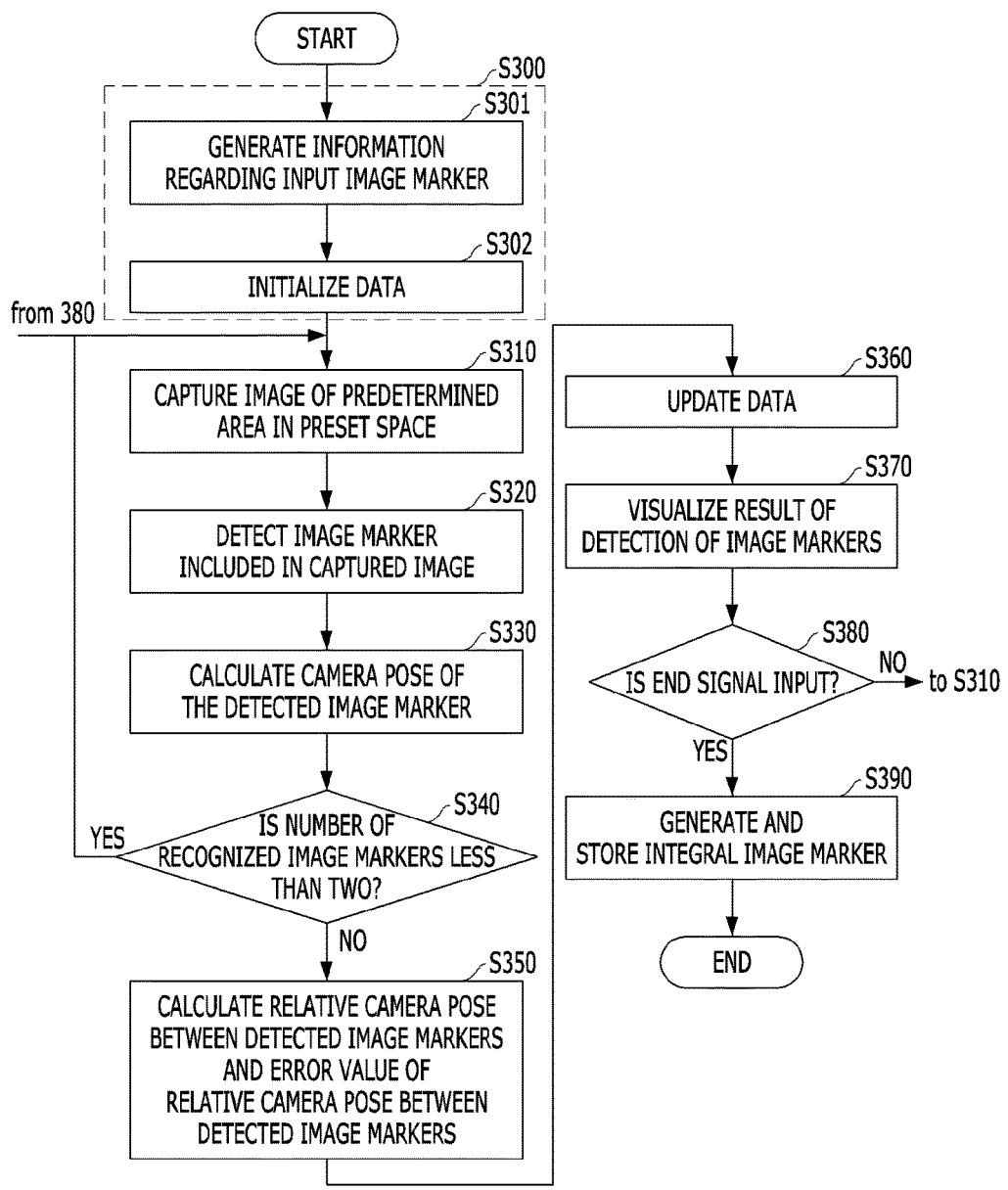
FIG. 3 is a flowchart showing a process of integrating multiple image markers to generate a single integral image marker according to an embodiment of the present invention.

FIG. 3 is a flowchart showing a process of integrating multiple image markers to generate a single integral image marker according to an embodiment of the present invention. The process shown in FIG. 3 may be performed by a system for generating an integral image marker shown in FIG. 5.

Referring to FIG. 3, a system for generating an integral image marker generates information regarding individual image markers that are input and used to realize a purpose such as implementation of augmented reality and initialize data for generating a single integral image marker (S300).

In detail, step S300 may include generating the information regarding the input image markers (S301) and initializing the data (S302).

In step S301, in addition to the image markers, information associated with a plane in which each image marker is positioned (image-marker-specific plane information) may be input as additional information.

Accordingly, it can be seen, through the image-marker-specific plane information, that image markers compared with each other are positioned on the same or different planes.

That is, since multiple input image markers are disposed in a space, all the image markers may be positioned in the same plane or in different planes. Thus, there is a need for information regarding planes in which the image markers are positioned.

For example, assuming that the first image marker is positioned in a first plane, the second image marker is positioned in the first plane, and the third image marker is positioned in a second plane, "1" may be input to the system as plane information of the first image marker in addition to the first image marker, "1" may be input to the system as plane information of the second image marker in addition to the second image marker, and "2" may be input to the system as plane information of the third image marker in addition to the third image marker.

Accordingly, since the plane information of the first image marker is "1," the plane information of the second image marker is "1," and the plane information of the third image marker is "2," the system may detect that the first image marker is positioned in the same plane as the second image marker and may detect that the third image marker is positioned in a different plane.

Also, in step S301, the information regarding the input image markers may include feature points for each marker and 2D positions and 3D positions of the feature points.

In step S302, unique identification information may be assigned to each image marker. For example, a number may be used as the identification information, and different numbers may be assigned to the image markers. Thus, the image markers are identifiable by the numbers.

Also, in step S302, error values and relative camera pose values of all combinable pairs of image markers may be initialized using the input image markers.

In this case, the error values may be initialized to any large number (e.g., number of feature points×100), and a storage area of the relative camera pose values may be initialized to be values of a 4×4 identity matrix.

For example, when integration is performed in a space composed of n image markers to generate one integral image marker, n×n data storage areas are allocated to initialize data on the image marker pairs.

In this case, error values and relative camera pose values of the image marker pairs may be initialized as follows:

$$Data[i][j].Error = \text{number of feature points} \times 100 \text{ (any large number)}$$

$$Data[i][j].relativePose = IdentityMatrix$$

where Data[i][j].Error is an error value of relative camera pose for an image marker pair (i, j), and Data[i][j].relativePose is a relative camera pose value of an image marker pair (i, j) (i<j).

After step S300, in order to implement augmented reality, the system captures an image of a predetermined area in a predetermined space with a camera (S310), compares the captured image with the image marker input in step S300 and detects an image marker included in the captured image (S320), and calculates a camera pose for the detected image marker (S330).

After step S330, the system determines whether the number of detected image markers is less than two (S340) and determines that the captured image is not valid when the number of detected image markers is less than two (yes in S340) and perform step S310.

That is, when the number of detected image markers is less than two, the system detects an image marker included in the next image and calculates a camera pose for the detected marker.

Also, when the number of detected image markers is greater than or equal to two (no in S340), the system determines that the captured image is valid, calculates relative camera pose between the detected image markers, and calculates error value of camera pose calculated in step S340 (S350).

That is, when the number of detected image markers is greater than or equal to two, the system calculates relative camera pose between the markers and error value of the relative camera pose.

In this case, in step S350, when the number of image markers detected in step S320 is greater than or equal to three, the system calculates relative camera pose of all combinable pairs.

For example, when the number of image markers detected in step S320 is three and the detected image markers are defined as marker 1, marker 2, and marker 3, the system calculates relative camera poses of a pair (marker 1, marker 2), a pair (marker 1, marker 3), and a pair (marker 2, marker 3) and error values of relative camera poses of the pairs in step S350.

Here, a relative camera pose of detected two markers may be represented using two camera pose values ($M_1$, $M_2$) calculated in step S330 as follows:

$$\text{Relative Camera Pose} = \text{Inverse}(M_1) * M_2, \text{ where a marker index of } M_1 \text{ is smaller than a maker index of } M_2.$$

In this case, the calculation of the relative camera pose between the image markers in step S350 may be performed on the basis of the unique identification information assigned in step S300.

For example, when a number is assigned to the unique identification information in step S300, the system may calculate a relative coordinate of an image marker with high unique identification information on the basis of an image marker with low unique identification information.

For example, when relative coordinates of a pair of image markers with unique identification information of 1 and 2 are calculated, the system may calculate a relative coordinate of the image marker with unique identification information of 2 on the basis of the image marker with unique identification information of 1.

That is, in order to calculate the relative camera pose of the image markers, a reference image marker is set. In the above example, the image marker with 1 as unique identification information is set as the reference image marker.

Also, in step S350, the system calculates the error value for the relative camera pose calculated in step S330.

In this case, when it is determined that the image marker pair used to calculate the relative camera pose are not positioned in the same plane on the basis of the plane information for the image marker input in step S300, the system may use a reprojection error value (Error=Func(3D position of detected feature point, 2D position of detected feature point, calculated camera pose), which is frequently used in the augmented reality field.

An error value of relative camera pose for detected image marker is calculated by summing calculated two reprojection values after calculating reprojection error value for each camera pose.

On the other hand, when it is determined that the image marker pair (marker j, marker k; assuming j<k) used to calculate the relative coordinates are positioned in the same plane on the basis of the plane information for the image marker input in step S300, the system may use Equation (1) below, instead of using the reprojection error value, in order to increase accuracy of calculation of the error value for the camera pose.

$$\text{Error} = \Sigma |P_{i,y}|, \text{ or}$$

$$\text{Error} = \Sigma |P_{i,z}| \quad \text{[Equation (1)]}$$

where $P_i$ denotes a 3D position value that is obtained by multiplying 3D position of each feature point in a target image marker k by a relative camera pose of the target image marker with respect to a reference image market, and may be calculated using Equation (2) below:

$$P_i = R_{jk} * (\text{3D position of feature point in target image marker } k \text{ in local coordinate system, 1}). \quad \text{[Equation (2)]}$$

$R_{jk}$ is a relative camera pose of the target image marker k with respect to a reference image marker j and is a 4×4 matrix including a rotational matrix R and a position vector t and having the following configuration:

$$R_{jk} = \begin{bmatrix} R & t \\ 0 & 1 \end{bmatrix}.$$

Since $R_{jk}$ is configured as a 4×4 matrix as described above, coordinates by which $R_{jk}$ is to be multiplied also have four elements, and a 3D position of each feature point in the target image marker k in the local coordinate system is composed of three coordinate values.

Thus, as expressed in Equation (2), it can be seen that "1" is added to the last of the 3D position of each feature point in the transformation target image marker k in the local coordinate system.

In Equation (1), $|P_i \cdot y|$ is an absolute value of a y-axis component extracted from the 3D coordinate value $P_i$, and $|P_i \cdot z|$ is an absolute value of a z-axis component extracted from the 3D coordinate value $P_i$.

In this case, $|P_i \cdot y|$ is used to calculate an error value when the x axis and the y axis among the 3D coordinate axes of the image marker correspond to the x axis and the y axis of the image coordinate axes, and $|P_i \cdot z|$ is used to calculate the error value when the x axis and the y axis among the 3D coordinate axes correspond to the x axis and the y axis of the image coordinate axes.

Also, $\Sigma|P_i \cdot y|$ denotes a total sum of absolute values of y-axis components of coordinates which are 3D positions of all the feature points in the target image marker k transformed into 3D coordinates $P_i$ in a coordinate system having the reference image marker j as a reference, and $\Sigma|P_i \cdot z|$ denotes a total sum of absolute values of z-axis components of coordinates which are 3D positions of all the feature points in the target image marker k transformed into 3D coordinates $P_i$ in a coordinate system having the reference image marker j as a reference.

In this case, when the calculated camera pose data for j and k has no error, the relative camera pose data for the image marker pair (j, k) also has no error, and the extracted y-axis component or the extracted z-axis component is zero.

On the other hand, as the error in the camera poses calculated for the image marker j and k increases, the error in the relative camera pose data for the image marker pair (j, k) also increases, and the extracted y-axis component or the extracted z-axis increases.

Accordingly, when there is no error in the calculated camera pose, $\Sigma|P_i \cdot y|$ or $\Sigma|P_i \cdot z|$ is zero. As $\Sigma|P_i \cdot y|$ or $\Sigma|P_i \cdot z|$ increases, the error in the calculated camera pose increases.

After step S350, the system updates prestored relative camera pose value between image markers and error value of relative camera pose of the image markers to the relative camera pose between the image markers and the error value of the relative camera pose of the image markers calculated in step S350 (S360).

In this case, when the error value of the relative camera pose calculated in step S350 are smaller than the prestored error value of the relative camera pose, the system updates the prestored relative camera pose matrix between the image markers and error value of the relative camera pose of the image markers.

Also, when the error value of the relative camera pose calculated in step S350 are larger than or equal to the prestored error value of the relative camera pose, the system does not update the prestored relative camera pose matrix between the image markers and error value of the relative camera pose of the image markers.

Thus, finally, when the error value of the relative camera pose is the smallest, the calculated relative camera pose value between the image markers is stored.

After step S360, the system visualizes a result of the detection of the image markers (S370), thus enabling a user to check the result of the detection of the image markers.

Step S370 is intended to provide the user with the recognition result for the image markers and thus enable the user to control movement of the camera and thus obtain a more accurate result of the recognition of the image markers. This step may be omitted as necessary.

For example, in step S370, the system may provide the error value of the relative camera pose in the form of text or may visualize a 3D object at a specific position by using the camera poses acquired in step S330 and the relative camera pose acquired in step S350 and then provide the visualized 3D object. Also visualization such as superimposition of the detected 2D feature points on the image informs the user of a current camera state (the number of detected markers and accuracy of the calculated camera pose).

Figure 4:
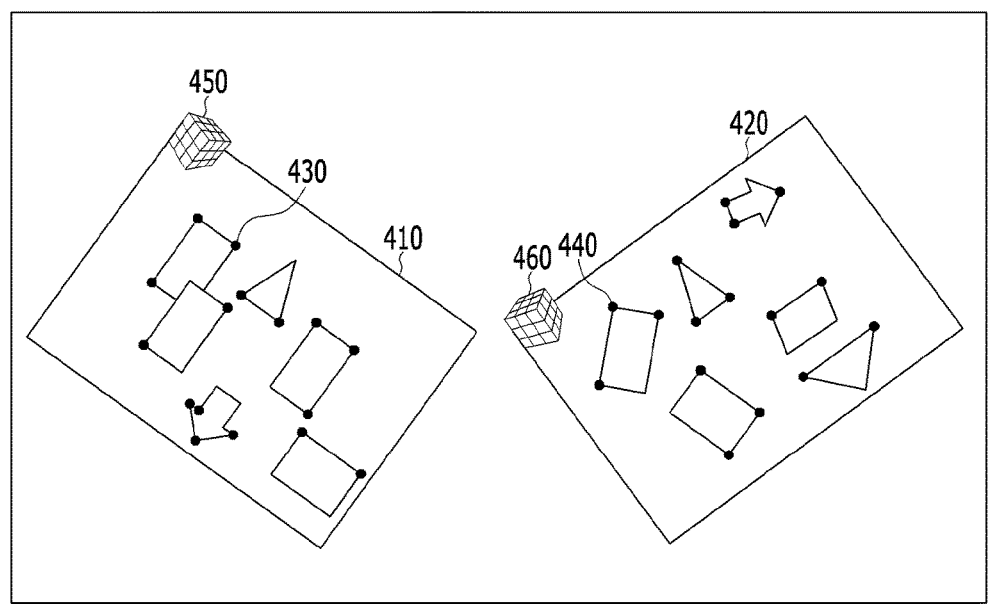
FIG. 4 is a diagram showing an example of a result of detecting an image marker provided during generation of an integral image marker according to an embodiment of the present invention.

FIG. 4 shows an example of a result of detecting an image maker provided during generation of an integral image marker according to an embodiment of the present invention.

In the example shown in FIG. 4, two image markers 410 and 420 are detected from an input image 400, and 2D feature points 430 and 440 detected from among multiple feature points included in the detected two image markers 410 and 420 by matching an image captured with a camera are represented by black dots.

Also, in order to check accuracy of the calculated camera pose, 3D objects 450 and 460 are displayed at upper left corners of the image markers 410 and 420 using the camera poses calculated in step S330 and the relative camera pose calculated in step S350.

As described above, through step S370 in which the detection result for the image marker is visualized, the user may become aware of how well the image marker is detected and how accurately the camera pose is calculated.

Accordingly, when it is determined that the image marker is not well detected or the camera pose is not accurately calculated, the user may change position of the camera to accurately detect the image marker or accurately calculate the camera pose.

After step S370, the system determines whether an end signal is input (S380) and performs step S310 when it is determined that no end signal is input (no in S380).

On the other hand, when it is determined that an end signal is input (yes in S380), the system generates and stores an integral image marker by applying prestored relative camera pose between image markers to 3D coordinates of feature points in a target image marker to perform a transformation (S390).

In this case, the system transforms coordinates of a pair of image markers positioned in the same plane and then coordinates of a pair of image markers positioned in different planes.

Also, when transforming coordinates of a pair of image markers positioned in the same plane and then coordinates of a pair of image markers positioned in different planes, the system first transforms coordinates of an image pair having a small camera pose error value.

According to the above coordinate transformation order, coordinates of an image pair positioned in the same plane and having the smallest relative camera pose error value are transformed first, and coordinates of an image pair positioned in different planes and having the largest relative camera pose error value are transformed last.

The method of generating an integral image marker according to an embodiment of the present invention has been described above. A detailed configuration for performing the above integral image marker generating method will be described below.

Figure 5:
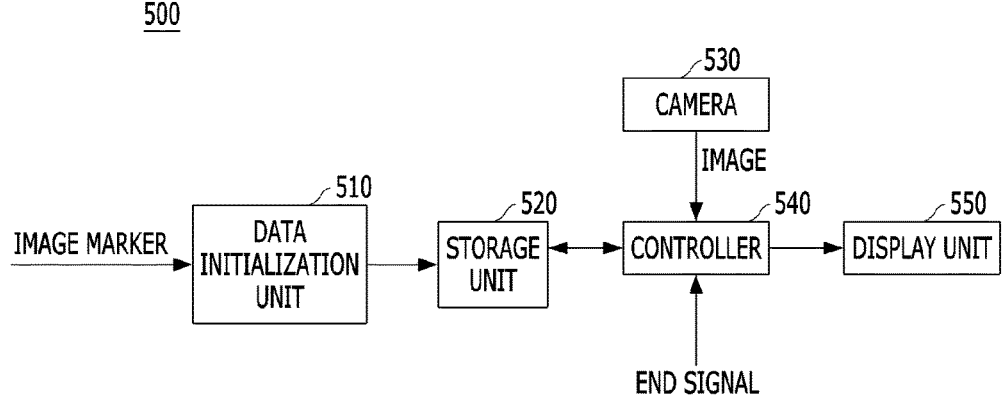
FIG. 5 is a diagram showing an example of a configuration of a system for generating an integral image marker according to an example embodiment of the present invention.

FIG. 5 is a diagram showing an example of a configuration of a system for generating an integral image marker according to an example embodiment of the present invention.

Referring to FIG. 5, a system 500 for generating an integral image marker according to an example embodiment of the present invention includes at least one processor for performing functions and a memory for storing information needed to perform the functions or a result of performing the functions.

In detail, the system 500 may include a data initialization unit 510, a storage unit 520, a camera 530, a controller 540, and a display unit 550.

The data initialization unit 510 generates information regarding individual image markers that are input and used to fulfill a purpose, such as implementation of augmented reality and initialize data for generating a single integral image marker.

A detailed function of the data initialization unit 510 will be omitted because the data initialization unit 510 performs step S300 of FIG. 3. The information generated by the data initialization unit 510 is stored in the storage unit 520.

Briefly, the data initialization unit 510 generates information for each input image marker and stores the generated information in the storage unit 520. In this case, plane information for each image maker is also stored.

Also, the data initialization unit 510 assigns unique identification information to each image marker and stores the identification information for each image marker.

Meanwhile, the data initialization unit 510 may initialize error values and relative camera pose matrix values of all image marker pairs that are obtainable by combining input image markers.

Also, the initialized error values and relative camera pose matrix values of the image marker pairs may be stored in the storage unit 520.

The storage unit 520 stores information oriented from the data initialization unit 510 or the controller 540 and provides the information to the controller 540 upon request. The camera 530 provides a captured image to the controller 540.

The controller 540 detects image markers included in the image and calculates a camera pose of each of the detected image markers on the basis of the information stored in the storage unit 520 and the image provided by the camera 530. When the number of detected image markers is greater than or equal to two, the controller 540 calculates relative camera pose between the detected image markers and error value of the relative camera pose between the detected image markers.

Also, the controller 540 updates prestored relative camera pose between markers and error value of the calculated relative camera pose between the markers and the calculated error values of the camera poses. Further, the controller 540 generate an integral image marker by applying the prestored relative coordinates between the image markers to 3D coordinates of feature points in a coordinate-transformation target image marker to perform the transformation.

That is, the controller 540 performs steps S320 to S390 of FIG. 3, and thus a detailed function of the controller 540 will be omitted.

Also, the display unit 550 is configured to display information provided by the controller 540. For example, the display unit 550 may display a result of the recognition of the image marker according to step S470 of FIG. 3.

According to an embodiment of the prevention, it is possible to configure content such as game content by calculating relative coordinates between multiple image markers and representing the plurality of image markers in one coordinate system using the calculated relative camera pose.

Accordingly, according to an embodiment of the present invention, since content may be configured in a single coordinate system, it is possible to facilitate configuration of content and stably calculate a camera pose even when only some of several marker images are visible in a captured image.

Even though all of the components of the above-described embodiment of the present invention may be combined as one component or operate in combination, the invention is not limited to the embodiment. In other words, all the components may be selectively combined as one or more components to operate within the scope of the invention. Also, each component may be implemented with one independent hardware device, but some or all of the components are selectively combined and implemented as a computer program having a program module for performing some or all functions combined in one or more hardware devices. Further, such a computer program may be stored in a computer-readable recording medium such as a USB memory, a CD disc. The embodiment of the present invention may be implemented by reading and executing the computer program. Examples of the computer-readable recording medium may include a magnetic recording medium, an optical recording medium, a carrier wave medium, and the like.

So far, the system and method of generating an integral image marker according to the present invention have been described with reference to the example embodiment. However, the present invention is not limited to the example embodiment, and it is obvious to those skilled in the art that various alternatives, modifications, and changes can be made without departing from the spirit and scope of the invention.

Accordingly, the embodiment and the accompany drawings of the present invention are to be considered descriptive and not restrictive of the invention, and do not limit the technical scope of the invention. The scope of the invention should be to be construed by the appended claims, and all technical ideas within the scope of their equivalents should be construed as included in the scope of the invention.

What is claimed is:

1. A system for generating an integral image marker, the system comprising:
   a data initialization unit configured to generate information regarding individual input image markers and initialize data;
   a storage unit configured to store the information generated by the data initialization unit and the data initialized by the data initialization unit;
   a camera configured to capture an image of a predetermined area and provide the captured image; and
   a controller configured to detect image markers included in the image, calculate a camera pose of each of the detected image markers when the number of detected image markers is greater than or equal to two, calculate relative camera pose between the detected image markers and error value of the relative camera pose between the detected image markers, update prestored relative camera pose between the detected image markers and error value of relative camera pose between the detected image markers and the calculated error value of the relative camera pose between the detected image markers, and generate an integral image marker by applying the prestored relative camera pose between the image markers to 3D coordinates of feature points in a target image marker, when an end signal is input.

2. The system of claim 1, wherein the data initialization unit initializes error values and relative camera pose values of all image marker pairs that are obtainable by combining input image markers, and assigns unique identification information to each image marker.

3. The system of claim 1, wherein when the number of detected image makers is greater than or equal to three, the controller calculates relative camera poses of all pairs that are obtainable by combining the detected image markers and error values of relative camera poses of the pairs.

4. The system of claim 1, wherein the controller calculates relative camera pose of an image marker to which high unique identification information is assigned with respect to an image marker to which low unique identification information is assigned.

5. The system of claim 1, wherein when the calculated error value of the relative camera pose is smaller than the prestored error value of the relative camera pose, the controller updates the prestored error value of the relative camera pose to the calculated error value of the relative camera pose.

6. The system of claim 1, wherein the controller first transforms coordinates of a pair of image markers positioned in the same plane.

7. The system of claim 1, wherein the controller transforms coordinates of a pair of image markers having small error value of relative camera pose.

8. The system of claim 1, wherein, when no pair of image markers is positioned in the same plane, the controller calculates error value of relative camera pose using sum of two reprojection error values.

9. The system of claim 1, wherein when a pair of image markers are positioned in the same plane, the controller calculates error value of relative camera pose using the following equation:

$$\text{Error} = \Sigma |P_i \cdot y|, \text{ or}$$

$$\text{Error} = \Sigma |P_i \cdot z|$$

where $\Sigma |P_i \cdot y|$ denotes a total sum of absolute values of y-axis components of coordinates which are 3D positions of all the feature points in the target image marker k transformed into 3D coordinates $P_i$ in a coordinate system having the reference image marker j as a reference, and $\Sigma |P_i \cdot z|$ denotes a total sum of absolute values of z-axis components of coordinates which are 3D positions of all the feature points in the target image marker k transformed into 3D coordinates $P_i$ in a coordinate system having the reference image marker j as a reference.

10. A method of generating an integral image marker, the method comprising:

generating information regarding individual input image markers and initialize data;

capturing an image of a predetermined area with a camera, detecting image markers included in the captured image, and calculating a camera pose of each of the detected image markers;

calculating relative camera pose between the detected image markers and error value of the relative camera pose between the detected image markers, when the number of detected image markers is greater than or equal to two;

updating prestored relative camera pose between detected image markers and error value of camera pose between detected image markers to the calculated relative camera pose between the detected image markers and the calculated error value of the relative camera poses of the detected image markers; and determining whether an end signal is input and generating an integral image marker by applying the prestored relative camera pose between the image markers to 3D coordinates of feature points in a target image marker, when an end signal is input.

11. The method of claim 10, wherein the initializing of data comprises initializing error values and relative camera pose values of all image marker pairs that are obtainable by combining input image markers, and assigning unique identification information to each image marker.

12. The method of claim 10, wherein plane information for each marker is input together with the individual image marker.

13. The method of claim 10, further comprising, when the number of detected image markers is less than two, detecting an image marker included in the next image and calculating a camera pose for the detected marker.

14. The method of claim 10, wherein the calculating of relative camera pose between the detected image markers and error value of the relative camera pose of the detected image markers comprises, when the number of detected image markers is greater than or equal to three, calculating relative camera poses of all pairs that are obtainable by combining the detected image markers and error values of relative camera poses of the pairs.

15. The method of claim 10, wherein the calculating of relative coordinates between the detected image markers comprises calculating relative camera pose of an image marker to which high unique identification information is assigned, with respect to an image marker to which low unique identification information is assigned.

16. The method of claim 10, wherein the calculating of error value of the relative camera pose comprises, when no pair of image markers are positioned in the same plane, calculating error value of relative camera pose using sum of two reprojection error values.

17. The method of claim 10, wherein the calculating of error value of the relative camera poses comprises, when a pair of image markers are positioned in the same plane, calculating error value of relative camera pose using the following equation:

$$\text{Error} = \Sigma |P_i \cdot y|, \text{ or}$$

$$\text{Error} = \Sigma |P_i \cdot z|$$

where $\Sigma |P_i \cdot y|$ denotes a total sum of absolute values of y-axis components of coordinates which are 3D positions of all the feature points in the target image marker k transformed into 3D coordinates $P_i$ in a coordinate system having the reference image marker j as a reference, and $\Sigma |P_i \cdot z|$ denotes a total sum of absolute values of z-axis components of coordinates which are 3D positions of all the feature points in the target image marker k transformed into 3D coordinates $P_i$ in a coordinate system having the reference image marker j as a reference.

18. The method of claim 10, wherein the updating comprises, when the calculated error value of the relative camera pose is smaller than the prestored error value of the relative camera pose, updating the prestored error value of the relative camera pose to the calculated error value of the relative camera pose.

19. The method of claim 10, further comprising, when no end signal is input, detecting image markers included in the next image and calculating a camera pose for each detected image marker.

20. The method of claim 10, wherein the generating of an integral image marker comprises transforming coordinates of a pair of image markers positioned in the same plane before transforming coordinates of a pair of image markers positioned in different planes and transforming coordinates of a pair of image markers having small error value of relative camera pose before transforming coordinates of a pair of image markers having large error value of relative camera pose.

* * * * *